(12) United States Patent
Treadwell

(10) Patent No.: US 9,187,109 B2
(45) Date of Patent: Nov. 17, 2015

(54) FOLDING TRAVEL WAGON

(71) Applicant: ACTIVE PRODUCTS INC., North York (CA)

(72) Inventor: Simon Treadwell, Toronto (CA)

(73) Assignee: ACTIVE PRODUCTS INC., Toronto (CA)

( * ) Notice: Subject to any disclaimer, the term of this patent is extended or adjusted under 35 U.S.C. 154(b) by 0 days.

(21) Appl. No.: 14/242,374

(22) Filed: Apr. 1, 2014

(65) Prior Publication Data
US 2015/0274186 A1 Oct. 1, 2015

(51) Int. Cl.
*B62B 3/02* (2006.01)

(52) U.S. Cl.
CPC .......................................... *B62B 3/02* (2013.01)

(58) Field of Classification Search
CPC ...... B62B 3/02; B62B 3/007; B62B 2205/04; B62B 2205/12; B25H 5/00
USPC ........ 280/651, 491.1, 491.3, 491.4, 495, 639, 280/30, 47.34, 47.371, 656, 47.38, DIG. 11
See application file for complete search history.

(56) References Cited

U.S. PATENT DOCUMENTS

| | | | | |
|---|---|---|---|---|
| 1,331,538 A * | 2/1920 | Spencer | ........................ | 108/132 |
| 1,523,355 A * | 1/1925 | Gleason | ........................ | 280/7.1 |
| 2,563,995 A * | 8/1951 | East | ............................... | 280/639 |
| 4,239,258 A * | 12/1980 | Burris | ........................... | 280/639 |
| 4,266,791 A * | 5/1981 | Myers | ............................... | 280/37 |
| 4,471,969 A * | 9/1984 | Zabala et al. | .................... | 280/30 |
| 4,580,799 A | 4/1986 | Quinonez | | |
| 4,796,909 A * | 1/1989 | Kirkendall | ..................... | 280/651 |
| 4,856,810 A * | 8/1989 | Smith | ............................ | 280/639 |
| 4,889,352 A | 12/1989 | Chamberlin, Jr. | | |
| 4,957,306 A * | 9/1990 | Greenberg | ..................... | 280/652 |
| 5,251,925 A * | 10/1993 | Haley, Sr. | ....................... | 280/641 |
| 5,318,312 A | 6/1994 | Montemayor | | |
| 5,524,915 A | 6/1996 | Liu | | |
| 5,570,898 A * | 11/1996 | Albert | ........................... | 280/656 |
| 5,611,552 A | 3/1997 | Miles | | |
| 5,730,449 A | 3/1998 | Miles | | |
| 5,957,482 A * | 9/1999 | Shorter | .......................... | 280/639 |
| 6,058,853 A * | 5/2000 | Pinch | ............................ | 108/129 |
| 6,471,173 B1 * | 10/2002 | Tseng | ............................ | 248/439 |
| 6,491,318 B1 * | 12/2002 | Galt et al. | ....................... | 280/651 |
| 6,733,026 B1 * | 5/2004 | Robberson et al. | ......... | 280/415.1 |
| 6,845,991 B1 * | 1/2005 | Ritucci et al. | .................... | 280/30 |
| 6,871,861 B2 | 3/2005 | Hernandez | | |
| 6,893,030 B2 * | 5/2005 | Shapiro | ....................... | 280/47.34 |
| 6,966,564 B2 | 11/2005 | Hernandez, Jr. | | |
| 7,097,182 B1 * | 8/2006 | Liu | ................................ | 280/42 |
| 7,441,783 B2 * | 10/2008 | Clark et al. | ..................... | 280/35 |
| 7,494,136 B2 | 2/2009 | Alves | | |
| 7,523,955 B2 * | 4/2009 | Blair | ............................. | 280/656 |
| 7,547,037 B2 * | 6/2009 | Poppinga et al. | ............. | 280/651 |

(Continued)

OTHER PUBLICATIONS

Mighty Hauler Folding Wagon, retrieved Apr. 1, 2014, online: <<mightyhaulercart.com>>.

(Continued)

*Primary Examiner* — Brodie Follman
(74) *Attorney, Agent, or Firm* — Bhole IP Law; Anil Bhole

(57) ABSTRACT

A folding wagon is described. Front and rear sections of the folding wagon fold toward each other for storage. The folding wagon has a lightweight, robust and compact construction.

11 Claims, 13 Drawing Sheets

(56) References Cited

U.S. PATENT DOCUMENTS

| | | | |
|---|---|---|---|
| 7,731,221 B2* | 6/2010 | Bess | 280/651 |
| 8,011,686 B2* | 9/2011 | Chen et al. | 280/651 |
| 8,087,679 B1 | 1/2012 | Salvucci, Jr. | |
| 8,091,916 B2* | 1/2012 | Shapiro | 280/644 |
| 8,220,824 B2 | 7/2012 | Chen | |
| 8,235,412 B2 | 8/2012 | Norton | |
| 8,448,978 B2 | 5/2013 | Alvarino | |
| 8,500,140 B1 | 8/2013 | Liao | |
| 8,613,462 B2 | 12/2013 | Bernard | |
| 8,851,503 B2* | 10/2014 | Tyson, III | 280/648 |
| D723,762 S * | 3/2015 | Treadwell | D34/17 |
| 8,973,940 B2* | 3/2015 | Chen et al. | 280/639 |
| 2002/0092445 A1* | 7/2002 | Glover et al. | 108/129 |
| 2003/0025301 A1* | 2/2003 | Banuelos, III | 280/651 |
| 2006/0119056 A1* | 6/2006 | Olsen | 280/30 |
| 2008/0073871 A1* | 3/2008 | Winkel | 280/415.1 |
| 2008/0073880 A1* | 3/2008 | Bess | 280/651 |
| 2008/0258435 A1* | 10/2008 | Blair | 280/639 |
| 2010/0072730 A1* | 3/2010 | Shapiro | 280/639 |
| 2010/0264625 A1* | 10/2010 | Zhu | 280/444 |
| 2011/0169238 A1* | 7/2011 | Schlegel et al. | 280/47.34 |
| 2013/0049332 A1 | 2/2013 | Evensen | |
| 2013/0243520 A1* | 9/2013 | Perosino et al. | 403/83 |
| 2014/0001735 A1* | 1/2014 | Yang et al. | 280/651 |
| 2014/0353945 A1* | 12/2014 | Young et al. | 280/650 |

OTHER PUBLICATIONS

Northern Tool and Equipment, Folding Utility Cart, retrieved Apr. 1, 2014, online: <<http://www.northerntool.com/shop/tools/product_200448973_200448973>>.

* cited by examiner

FOLDING TRAVEL WAGON

TECHNICAL FIELD

The following relates generally to a wagon and more specifically to a folding wagon.

BACKGROUND

There exist several folding wagons, carts and trailers with various mechanisms for folding. Some of these folding wagons, carts and trailers have sidewalls for holding items. Typically, these walls must be removed or folded in order to permit the multiple sections of the wagons, carts and trailers to be folded.

SUMMARY

In one aspect, a folding wagon is provided, which comprises front and rear sections. Each section comprises a base, and a suspension mounted to the lower surface of the base and supporting at least one wheel. A hinge disposed upwardly distal from the front and rear bases couples the front section to the rear section so that the sections are rotatable between an extended position wherein the front section is substantially coplanar with the rear section and a folded position wherein upper surfaces of the front and rear sections oppose each other. At least one retainer is provided for releasably retaining the front and rear sections in the extended position.

BRIEF DESCRIPTION OF THE DRAWINGS

The features of the invention will become more apparent in the following detailed description in which reference is made to the appended drawings wherein.

DETAILED DESCRIPTION

Figure 1:
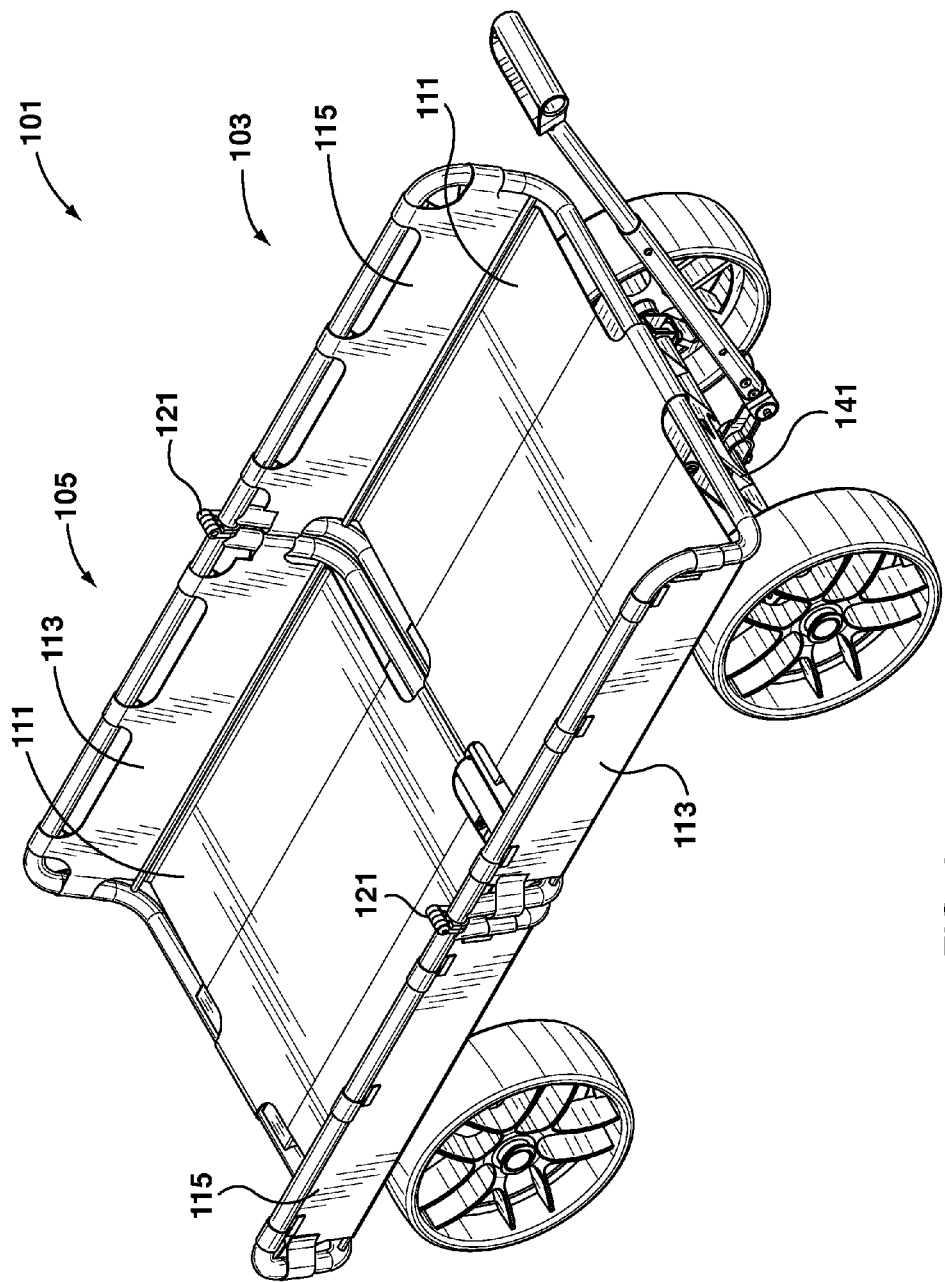
FIG. 1 is a front left perspective view of an embodiment of a folding wagon in an extended position.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

The following provides a folding wagon comprising front and rear sections. Each section comprises a base and a suspension mounted to the lower surface of the base and supporting at least one wheel. A hinge disposed above the front and rear bases couples the front section to the rear section, respectively, so that the sections are rotatable relative to one another between an extended position wherein the front section is substantially coplanar with the rear section and a folded position wherein upper surfaces of the front and rear sections oppose each other. At least one retainer is provided for releasably retaining the front and rear sections in the extended position. Although the hinges are described herein as being disposed "above" each of the bases, it will be understood that the term "above" refers to the position of the hinges relative to each of the bases, and not necessarily with other coordinate systems, i.e., the hinges are disposed apart from each of the front and rear bases at a distance extending from the upper surface thereof.

Referring now to FIG. 1, an embodiment of the folding wagon 101 is shown. The folding wagon 101 comprises a front section 103 and a rear section 105. The front section 103 comprises a base 111 and a front suspension 141 mounted to the lower surface of the front section 103. The front suspension 141 supports two wheels 131. The rear section 105 comprises a base 111 and a rear suspension 151 mounted to the lower surface of the rear section 105. Hinges 121 are disposed above the base 111 of the front section 103 and the base 111 of the rear section 105 and pivotally couple front section 103 to rear section 105, permitting the front section 103 and the rear section 105 to rotate between: (a) an extended position as shown in FIGS. 1-4 and 7-9 wherein the base 111 of the front section 103 is substantially coplanar with the base 111 of the rear section 105; and (b) a folded position as shown in FIG. 12 in which the upper face of the base 111 of the front section 103 opposes, and is substantially parallel to, the upper face of the base 111 of the rear section 105. As shown in FIGS. 4, 8, 9, 10 and 11, latches 161 releasably retain the front section 103 in substantially coplanar arrangement with the rear section 105 so that the folding wagon 101 is retained in the extended position as hereinafter described in greater detail.

Referring now to FIGS. 4, 8, 9 and 10, the configuration of an embodiment of the latch 161 will be described in greater detail. The figures depict two latches 161, one pivotally coupled to the front section 103 and releasably engaging the rear section 105, and the other pivotally coupled to the rear section 105 and releasably engaging the front section 103. As depicted, latch 161 is preferably an over-centre latch. The latch 161 will hereinafter be described in the former configuration.

Figure 10:
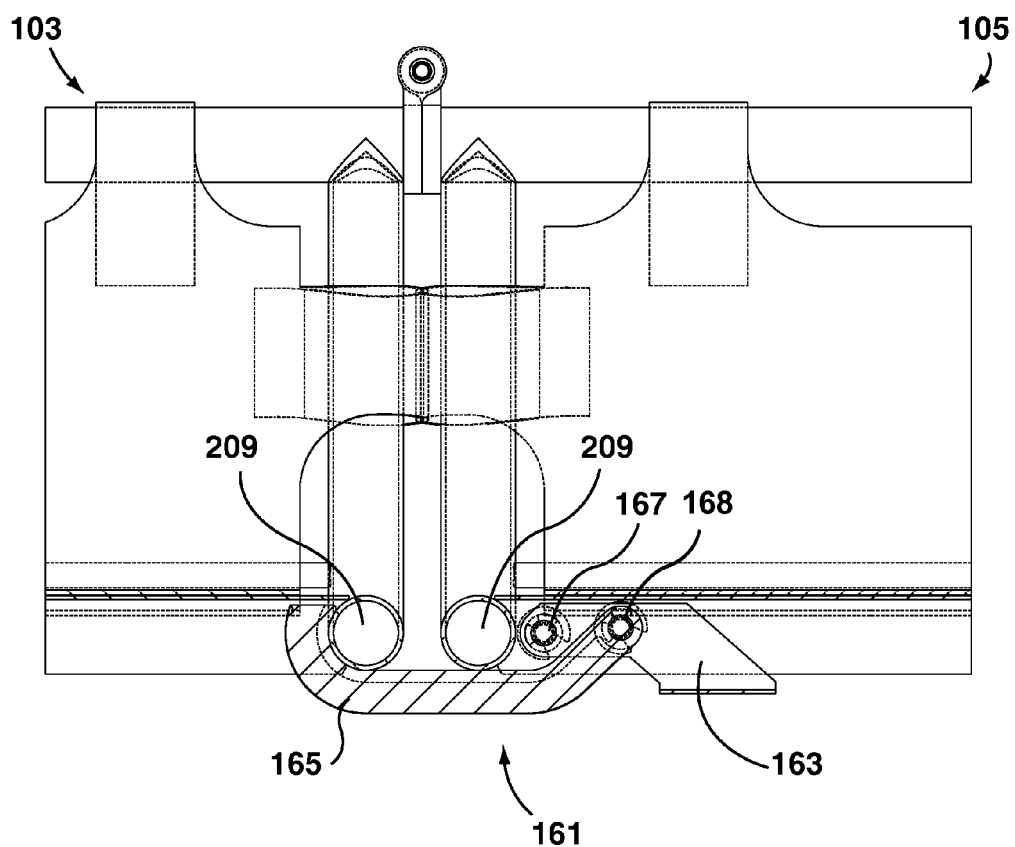
FIG. 10 is a partial cross-sectional view of one of the latches taken along line 10-10 in FIG. 2.

As best seen in FIG. 10, latch 161 comprises: (a) a lever 163 pivotally coupled by first pin 167 to the lower surface of the rear section 105; and (b) a claw 165 pivotally coupled by second pin 168 to lever 163. The claw 165 comprises a first, curved end, the curvature of the curved end having a radius substantially similar to the radius of inner transverse tube 209 so that the curved end partially encircles the inner transverse tube 209 to permit secure engagement. Preferably, the curved end loops back no further than the longitudinal travel provided to the claw 165 by the lever 163. Claw 165 continues longitudinally to a second end where it comprises transverse holes for the second pin 168. The second pin 168 provides for pivotal engagement between the claw 165 and the lever 163. Claw 165 comprises a centre section that is offset away from the lower surfaces of the front and rear sections 103 and 105 to accommodate the inner transverse tubes 209. Lever 163 is pivotally coupled to a truss 211 by the first pin 167. Preferably, the second pin 168 is closer to the lower surface of the first section than the first pin 167 so that the force applied by the claw 165 to the lever 163 tends to bias the lever 163 to retain the front and rear sections 103 and 105. In use, a user releases the latch 161 by pulling lever 163 away from the lower surface of the front section 103. The lever 163 will pivot about the first pin 167. Consequently, the second pin 168 will rotate the second end of the claw 165, causing the curved end of the claw 165 to travel away from inner transverse tube 209. The claw 165 can then be removed from engagement with inner transverse tube 209. It will be appreciated that the same process can be reversed in order to engage the latch 161.

In embodiments, each of front section 103 and rear section 105 further comprises first 113 and second 115 sidewalls which extend upwardly from the base of each respective section, as shown in FIG. 1. Each sidewall preferably defines a corner coupled to hinge 121. The hinge is disposed in or above the plane defined by the top of the sidewalls 113 and 115, such that the sidewalls 113 and 115 do not need to be removed or folded when the folding wagon is folded into the folded position. It will be appreciated that the first 113 and second 115 sidewalls may extend perpendicularly to the base 111 or may extend outwardly or inwardly (e.g., at an angle) from the base 111, although the latter configuration is not depicted. Preferably the first 113 and second 115 sidewalls extend upwardly from the base 111 in order to retain contents placed in the folding wagon 101. It will be further appreciated that frames forming the base and the first and second sidewalls 113 and 115 may be monolithically formed. For instance, a frame for the base, when viewed from the front may have a U-shaped, semi-circular or other similar cross-section so as to retain any objects placed therein. Conversely, in further embodiments, the sidewalls 113 and 115 are separate from the base 111.

Figure 6:
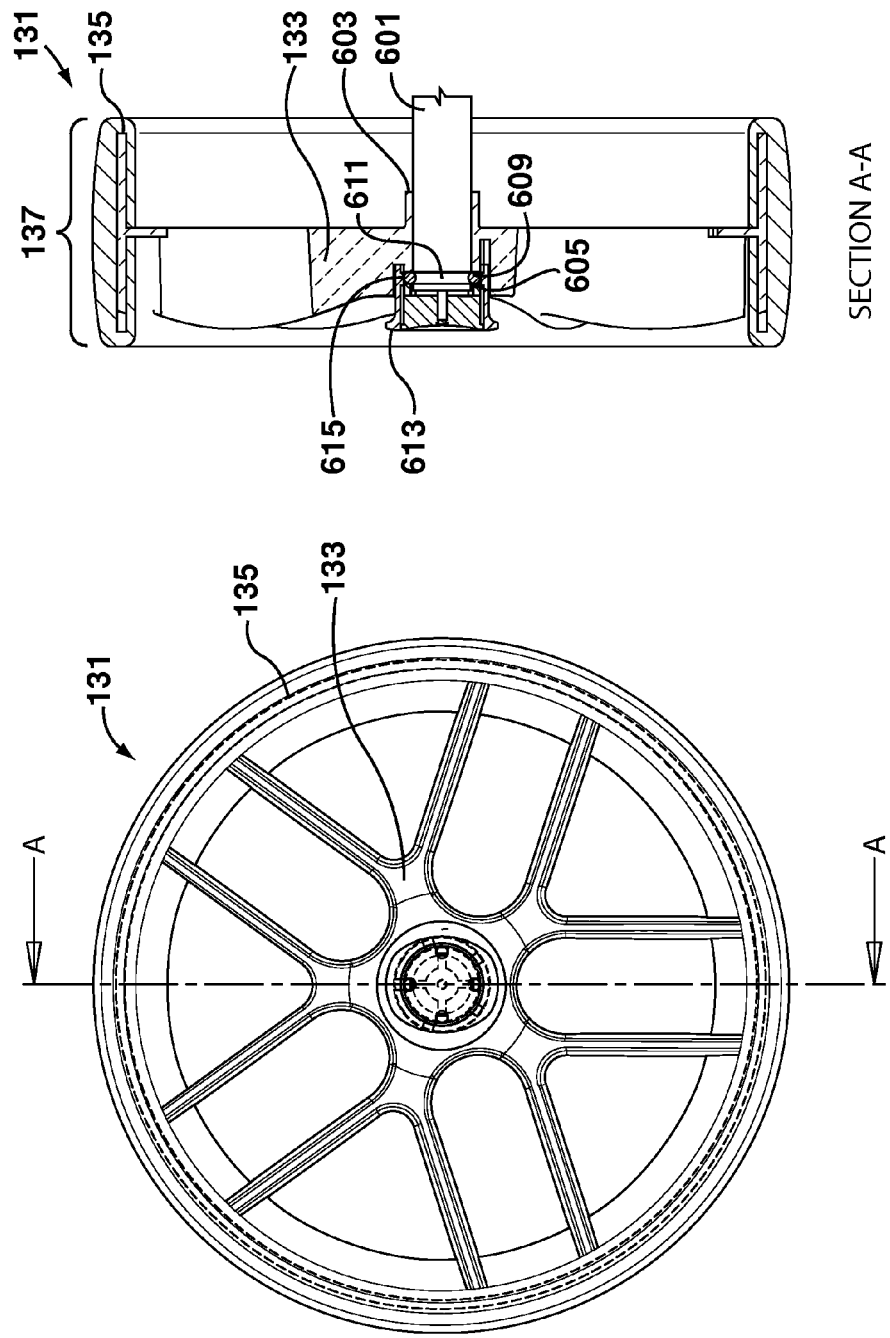
FIG. 6A is a side view of an embodiment of a wheel depending from the folding wagon in the extended position.
FIG. 6B is a cross-sectional view of the wheel taken along the line A-A shown in FIG. 6A.
Figure 7:
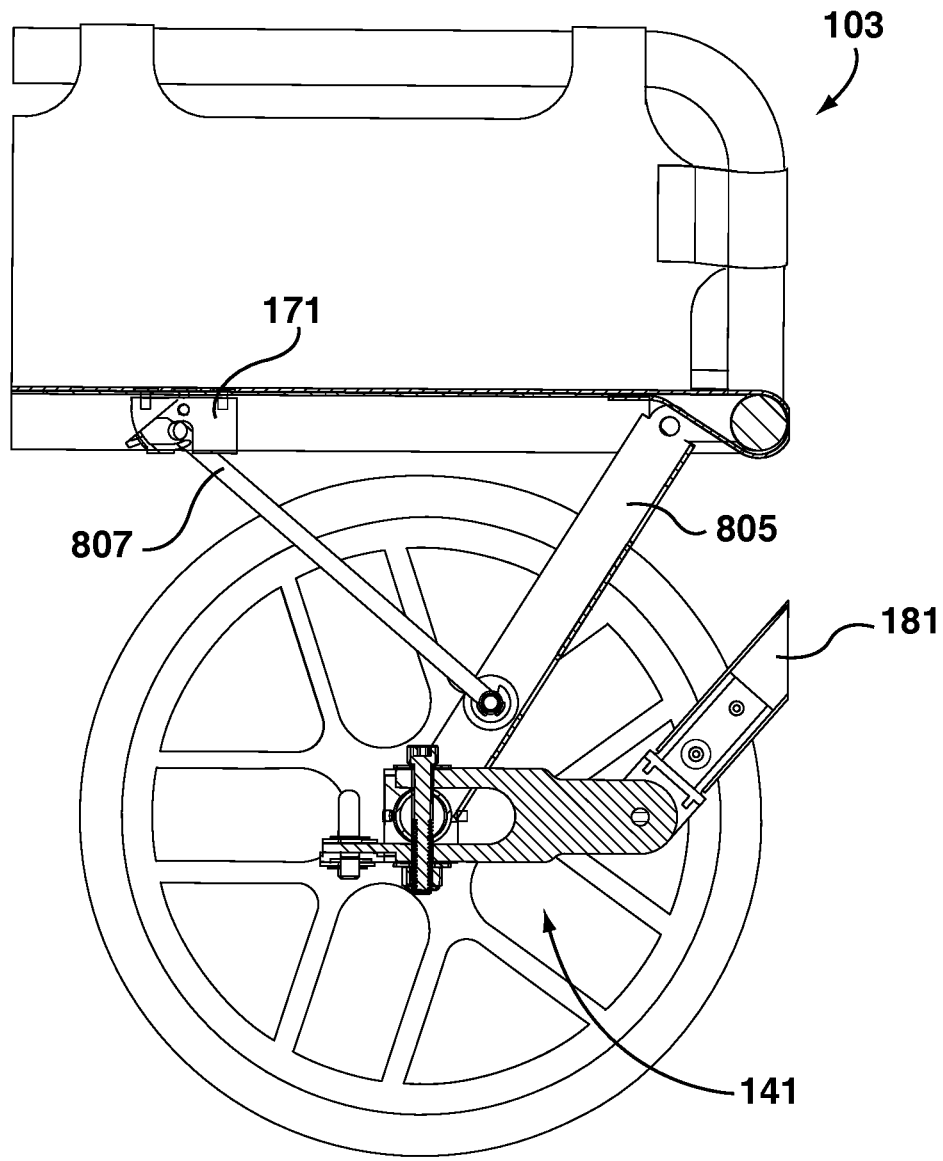
FIG. 7 is a partial cross-sectional view of an embodiment of a suspension taken along the line 7-7 shown in FIG. 2.

In embodiments, the sidewalls extend sufficiently above the base 111 so that the height of the sidewalls is greater than or equal to the depth 137 of the wheel 131 so that, when the folding wagon 101 is in the folded position, the distance between the upper surface of base 111 of the front section 103 and the upper surface of the base 111 of the rear section is greater than or equal to twice the depth 137 of the wheels 131 shown in FIG. 6B. As shown in FIG. 12, such an arrangement permits a user to place the wheels 131 two deep within a compartment defined by the front section 103 and the rear section 105 to encompass the wheels 131 when the folding wagon 101 is in the folded position, thereby saving space when the wheels 131 are removed as described below. In further embodiments, the height of each sidewall 113 and 115 is greater than or equal to the depth 137 of the wheels 131 so that when the folding wagon 101 is in the folded position, the distance between the upper surface of base 111 of the front section 103 and the upper surface of the base 111 of the rear section is greater than or equal to the depth 137 of each wheel 131.

In further embodiments, which are not shown, the front and rear or front or rear sections do not have sidewalls. In such embodiments, the hinges 121 are disposed above the base 111 by other means. For instance, hinge 121 may depend from base 111 by any known armature or spacer. Preferably, hinge 121 is disposed sufficiently upwardly distal from the base 111 so that the upward distance between the base 111 and the hinge 121 is greater than or equal to the width of wheel 131. Such an arrangement permits the front section 103 and the rear section 105 to encompass the wheels 131 when the folding wagon 101 is in the folded position, thereby saving space when the wheels 131 are removed as described below. In still further embodiments, only one hinge 121 is required to provide for folding the folding wagon as described herein. For instance, a single hinge 121 may pivotally couple the front section 103 to the rear section 105.

Preferably, the base 111 of the front section 103 is identical to the base 111 of the rear section 105. Additionally, the first sidewall 113 of the front section is preferably identical to the first sidewall of the rear section 105, and the second sidewall 115 of the front section 103 is preferably identical to the second sidewall 115 of the rear section, such that the front section 103 differs from the rear section 105 only insofar as the front suspension 141 is different from the rear suspension 151, if at all. It will be appreciated that such a configuration simplifies manufacturing of the folding wagon 101 by reducing the number of distinct parts in the assembly. It will be further appreciated, however, that the base 111, first sidewall 113 and second sidewall 115 of the front section 103 may differ from the corresponding components in the rear section 105.

Figure 2:
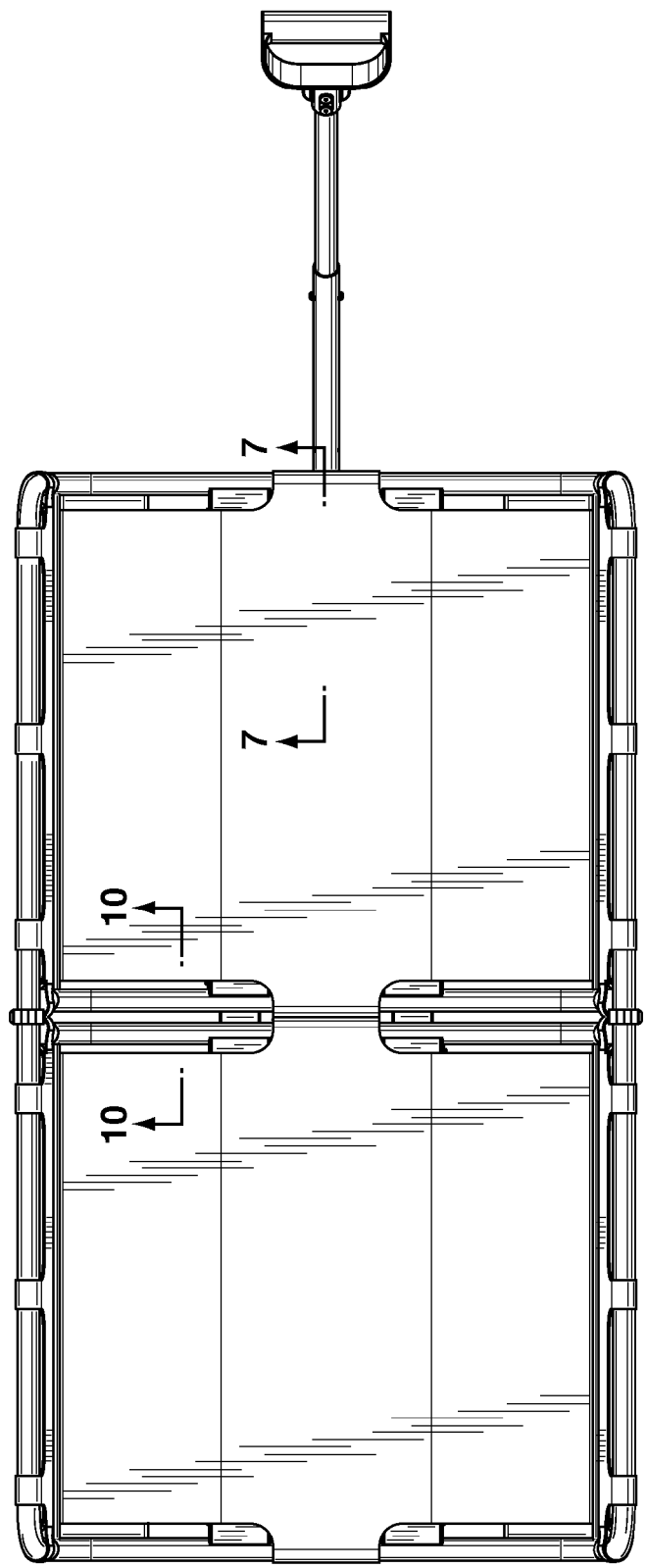
FIG. 2 is a top view of the folding wagon in the extended position.
Figure 3:
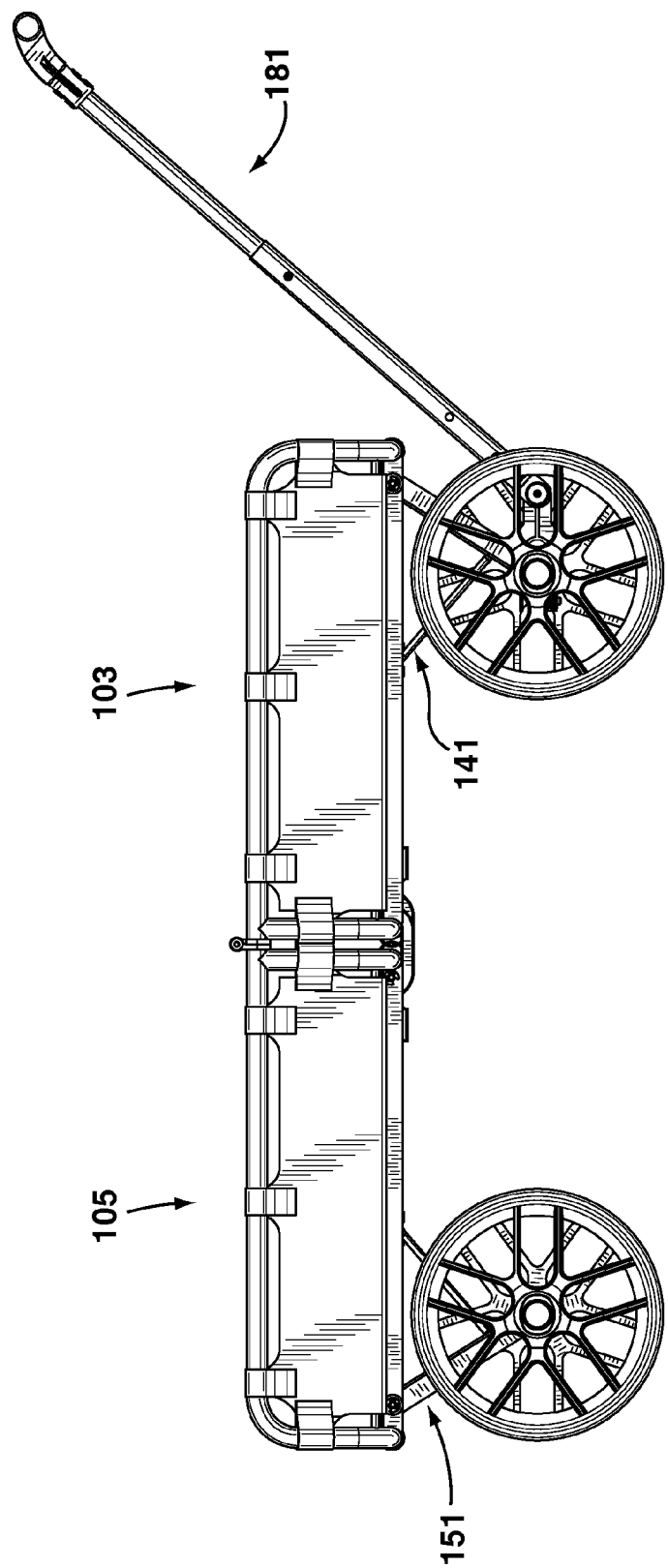
FIG. 3 is a left side view of the folding wagon in the extended position.
Figure 4:
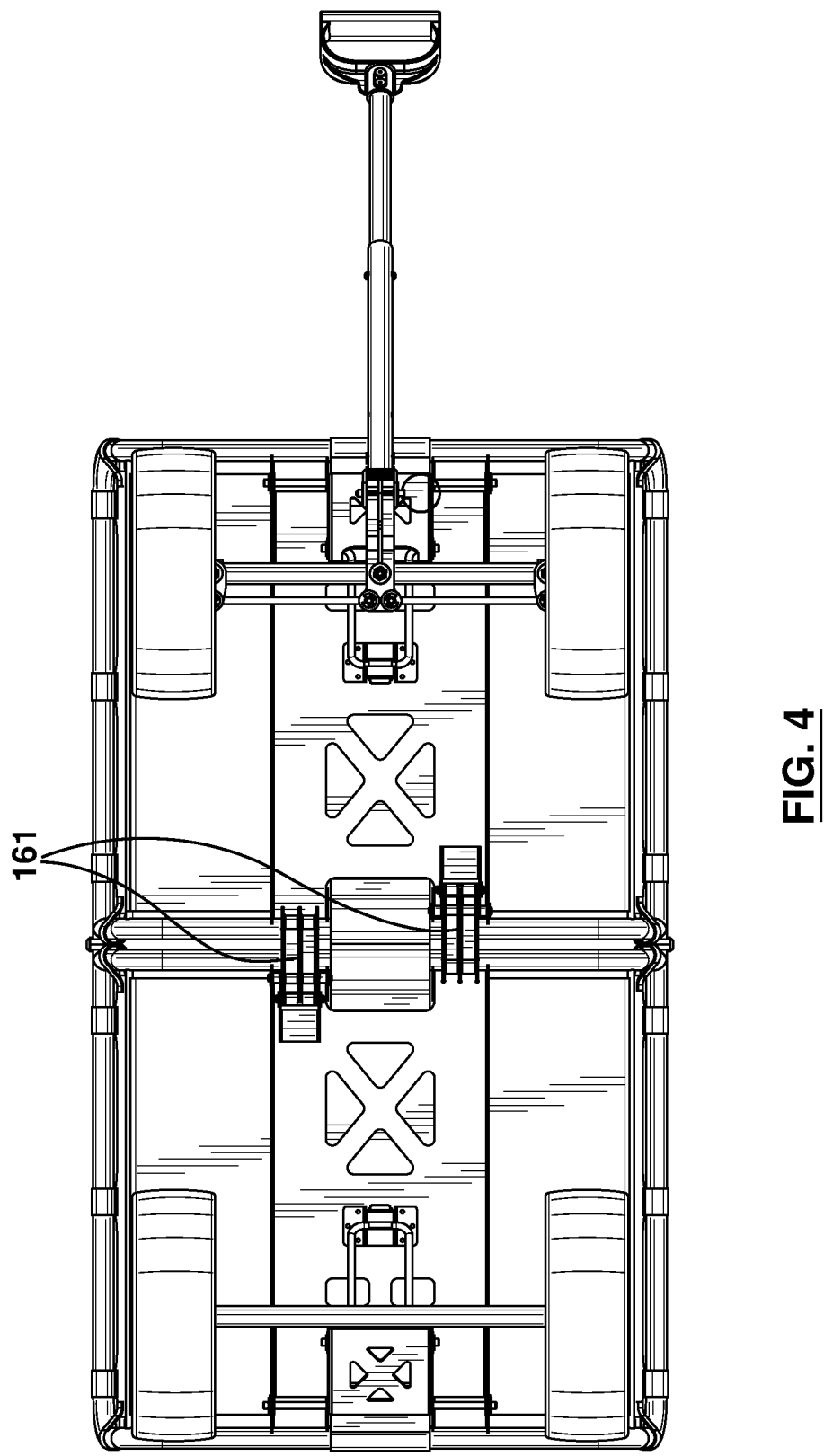
FIG. 4 is a bottom view of the folding wagon in the extended position.
Figure 5:
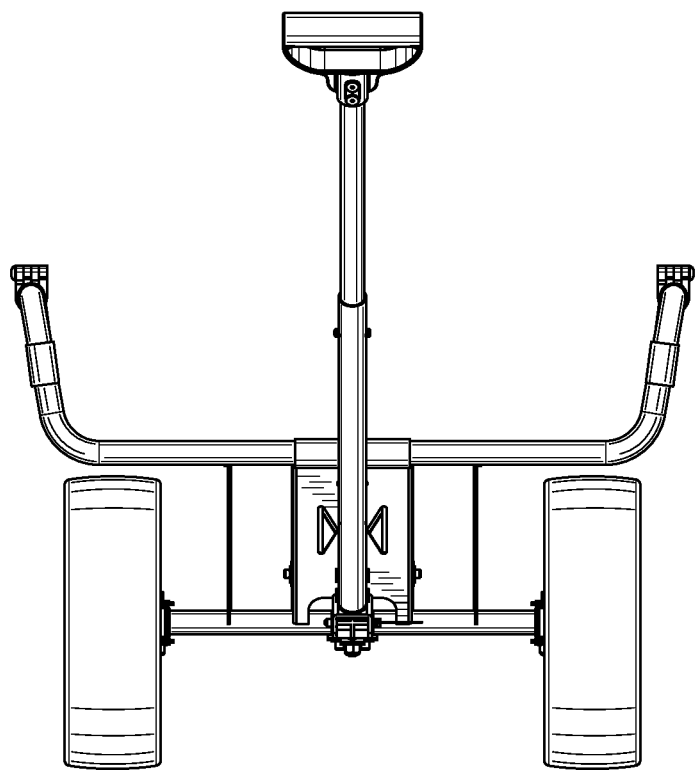
FIG. 5 is a front view of the folding wagon in the extended position.
Figure 9:
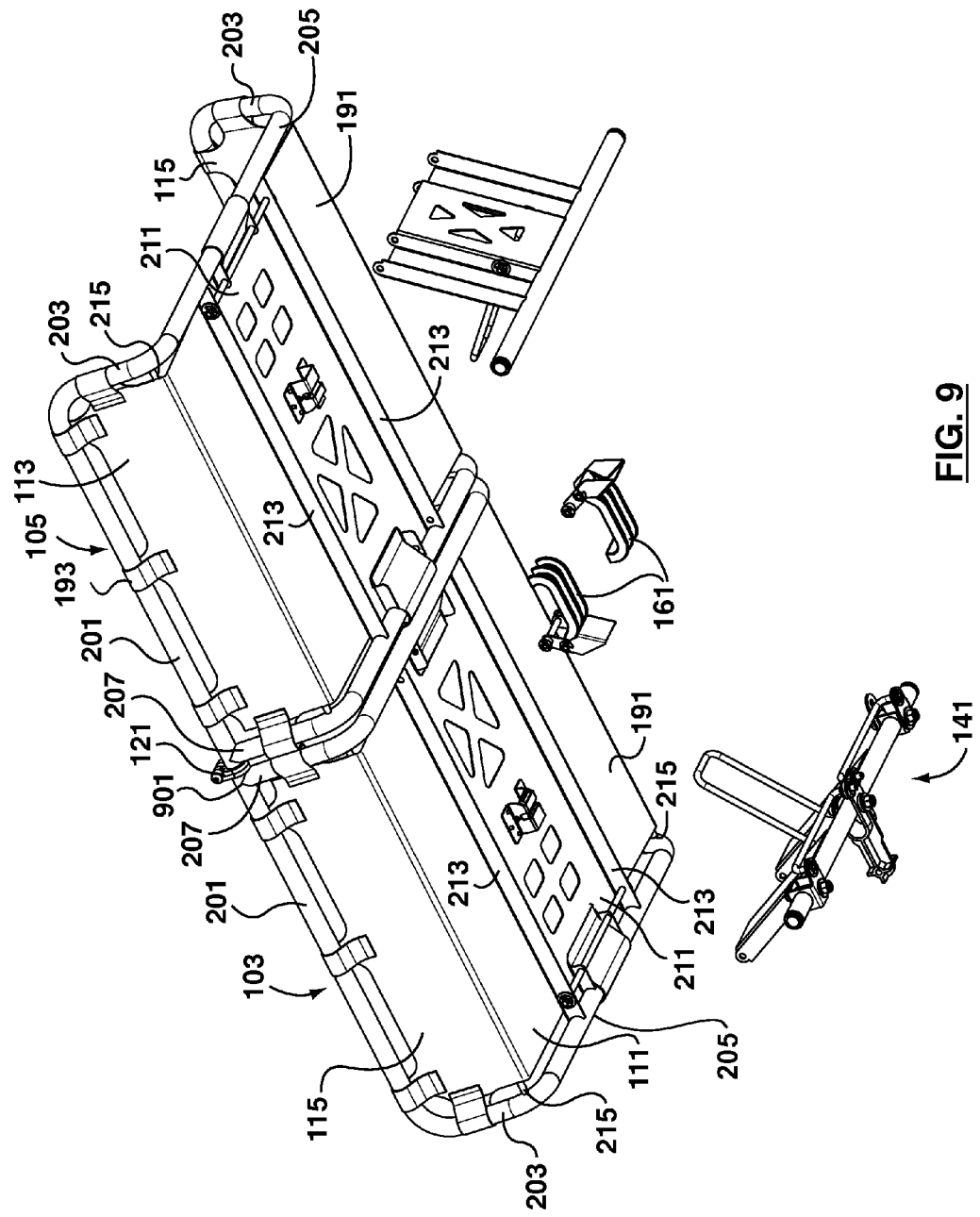
FIG. 9 is an exploded bottom left perspective view of the folding wagon in the extended position more particularly showing latches and the suspension.

In embodiments, the folding wagon 101 has a lightweight thin plate and tubular structure as shown in the drawings. As best seen in FIG. 9, the front section 103 has a base 111 and sides 113 and 115 defined by a tubular frame 901. Referring now to FIGS. 2, 3 and 4, tubular frame is defined by opposing top tubes 201, each extending horizontally from one of the hinges 121 to an arcuate intersection with outer down tube 203. Outer down tube 203 continues downwardly to arcuate intersection with outer transverse tube 205. Inner down tubes 207 each begin at the intersection between one of the hinges 121 and one of the top tubes 201. The inner down tubes 207 descend into arcuate intersection with inner transverse tube 209.

Figure 8:
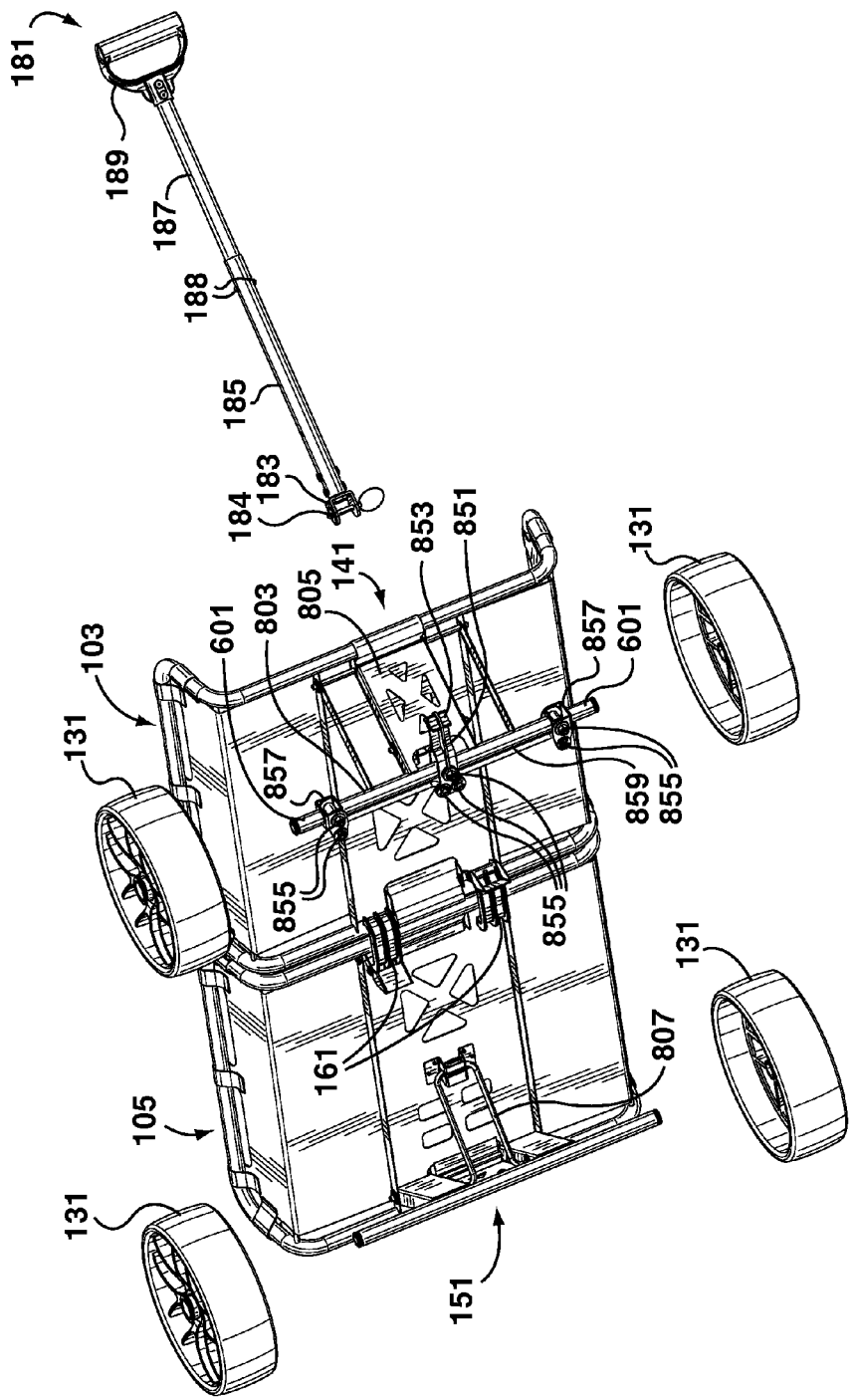
FIG. 8 is a bottom left perspective view of the folding wagon in the extended position showing the wheels and a handle removed from the folding wagon.

A thin-walled sheet metal truss 211 has flanges 213 which add strength and which also provide for mounting the front suspension 141 and latch 161 to the lower side of the front section, as shown in FIG. 8. As viewed in FIG. 9, two rods 215 are provided for supporting a flexible surface 191, described in greater detail below. Each rod 215 is disposed between the arcuate intersection of the outer down tube 203 with the outer transverse tube 205, and the arcuate intersection of the inner down tube 207 and the inner transverse tube 209.

The tubular frame 901 is preferably constructed of thin-walled stainless steel to reduce weight and resist corrosion. The truss 211 is coupled at one end to the outer transverse tube 205 and at the other end to inner transverse tube 209. A flexible surface 191 is stretched between the tubular elements of the tubular frame 901 to form the sidewalls 113 and 115, as well as the base 111. The truss 211 supports the base 111. Flexible surface 191 is preferably made of a semi rigid polymer material. An example is a thin-stretched, semi rigid high-density polyethylene (HDPE), which has suitable strength-to-weight properties. However, other materials may be used, including cotton canvas, sheet metal or the like. Flexible surface 191 is preferably attached to the elements of the tubular frame 901 by riveting each of flexible tabs 193 around a tube and back on to the flexible surface 191.

Wheels 131 may be removable for easier stowage of the folding wagon 101, as shown in FIG. 8. Preferably, wheels 131 are easily detachable. Preferably, the wheels are of suitable dimension that the set of wheels, and yet more preferably also the handle, can be stowed within the wagon when folded. The wheels may be stowed freely within the folded wagon or a suitable retaining mechanism could be used. If stowed freely, preferably the wheels are of suitable dimension that they fit snugly in the folded wagon.

Referring to FIGS. 6A and 6B, an embodiment of wheel 131 is shown in which the wheel 131 is easily detachable by way of a tubular sleeve 613. Wheel 131 has a hub 133 and a tire 135. Preferably, the tire 135 is pneumatic to provide a gentle ride; however, the tire 135 may be fabricated of solid rubber, hollow plastic or any other suitable material. Axle 601, which is cylindrical, is coupled at one end to the suspension 151, described below in greater detail and shown in FIG. 9, and at a second end is releasably disposed within a collar 603 in hub 133. Near its second end, the axle 601 has a groove about its circumference to serve as a detent 611 for ball plungers 609. Collar 603 is concentric about the axle 601 and the wheel 131. Collar 603, which has substantially tubular walls disposed with radial raceways 605, extends outwardly axially from the hub 133. The raceways 605 retain ball plungers 609. A tubular sleeve 613 surrounds the collar 603 and can slide along the axis of rotation of the collar 603. Sleeve 613 has angular teeth 615 that correspondingly interface with ball plungers 609. In a locked position as shown in FIG. 6B, the teeth 615 of sleeve 613 radially inwardly direct ball plungers 609 along raceways 605 so that the ball plungers 609 engage detents 611 in the axle 601, thus locking the wheel 131 to the axle 601. In use, the wheel 131 is released from the axle 601 by sliding sleeve 613 axially away from the axle 601 so that the teeth 615 no longer radially inwardly direct ball plungers 609; ball plungers 609 are thus free to retract along raceways 605 away from detent 611, thereby permitting axle 601 to be freely withdrawn from hub 133. Preferably, a spring (not shown) is disposed between the tubular sleeve 613 and the collar 603 to bias the tubular sleeve 613 in the locked position. While one quick release embodiment is described herein, it will be appreciated that other quick release mechanisms are known in the art and could be used to effect easy release of wheels 131 from their respective axles.

In embodiments, front suspension 141 and rear suspension 151 are configured to fold when wheels 131 are removed as previously described in detail. The structure and operation of the folding configuration are described herein with reference to the front suspension 141, but it will be appreciated that the same structure and configuration applies to the rear suspension 151 with suitable modification to accommodate the fixed axle 621 shown on rear suspension 151 in FIG. 8. As shown in FIG. 8, the front suspension 141 comprises: (a) a transverse support 803 which supports axles 601 for releasably mounting wheels 131 as previously described; (b) leg 805 having a first end attached to the transverse support 803 and a second end pivotally coupled to the lower surface of the front section 103; (c) a stay 807 having a first end pivotally coupled to the leg 805 and a second end for engagement with retainer 171 mounted to the lower surface of the front section 103. The first end of the stay 807 is pivotally coupled to the leg 805 between the first and second ends thereof. Preferably, the first end of stay 807 is pivotally coupled as closely as possible to the first end of the leg 805 to maximise the torque provided by the stay 807 to the leg 805.

Figure 12:
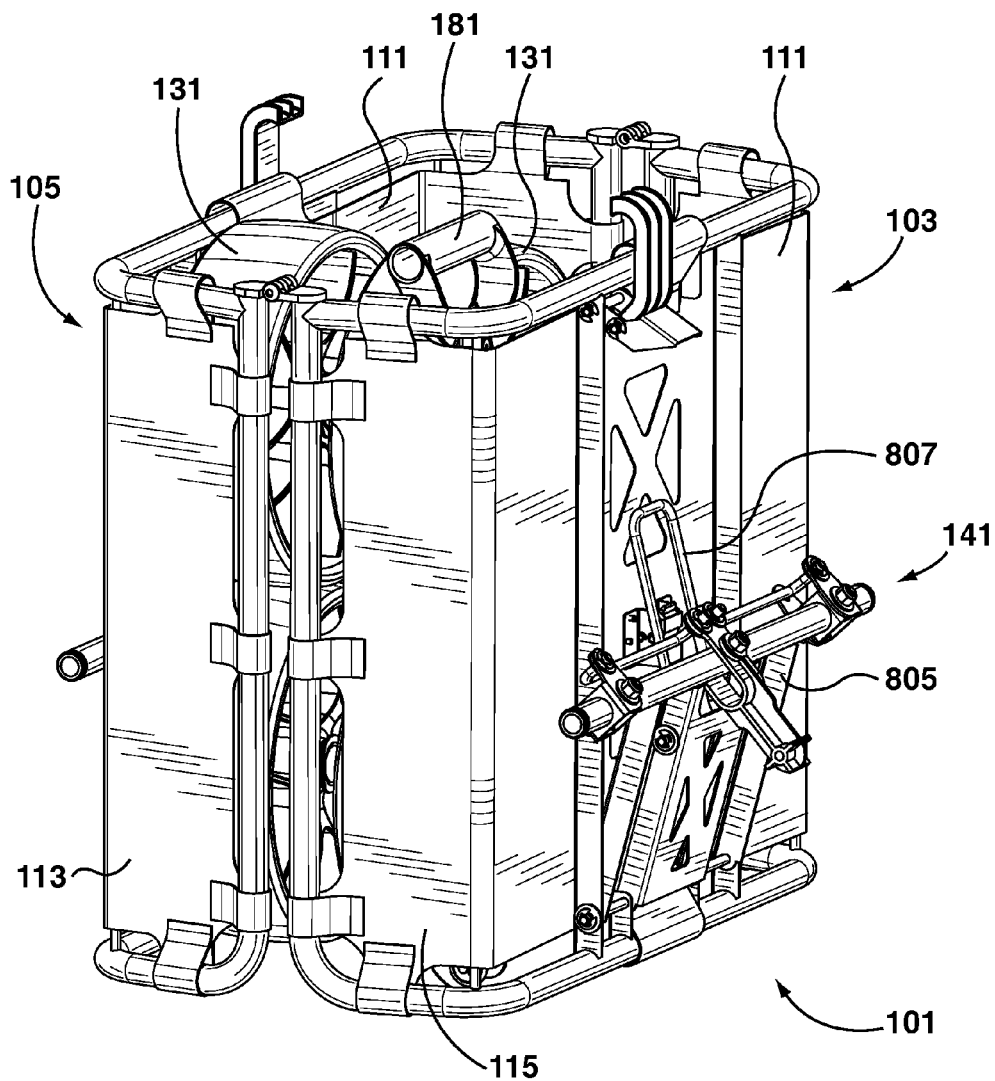
FIG. 12 is a perspective view of the folding wagon in a folded position.
Figure 13:
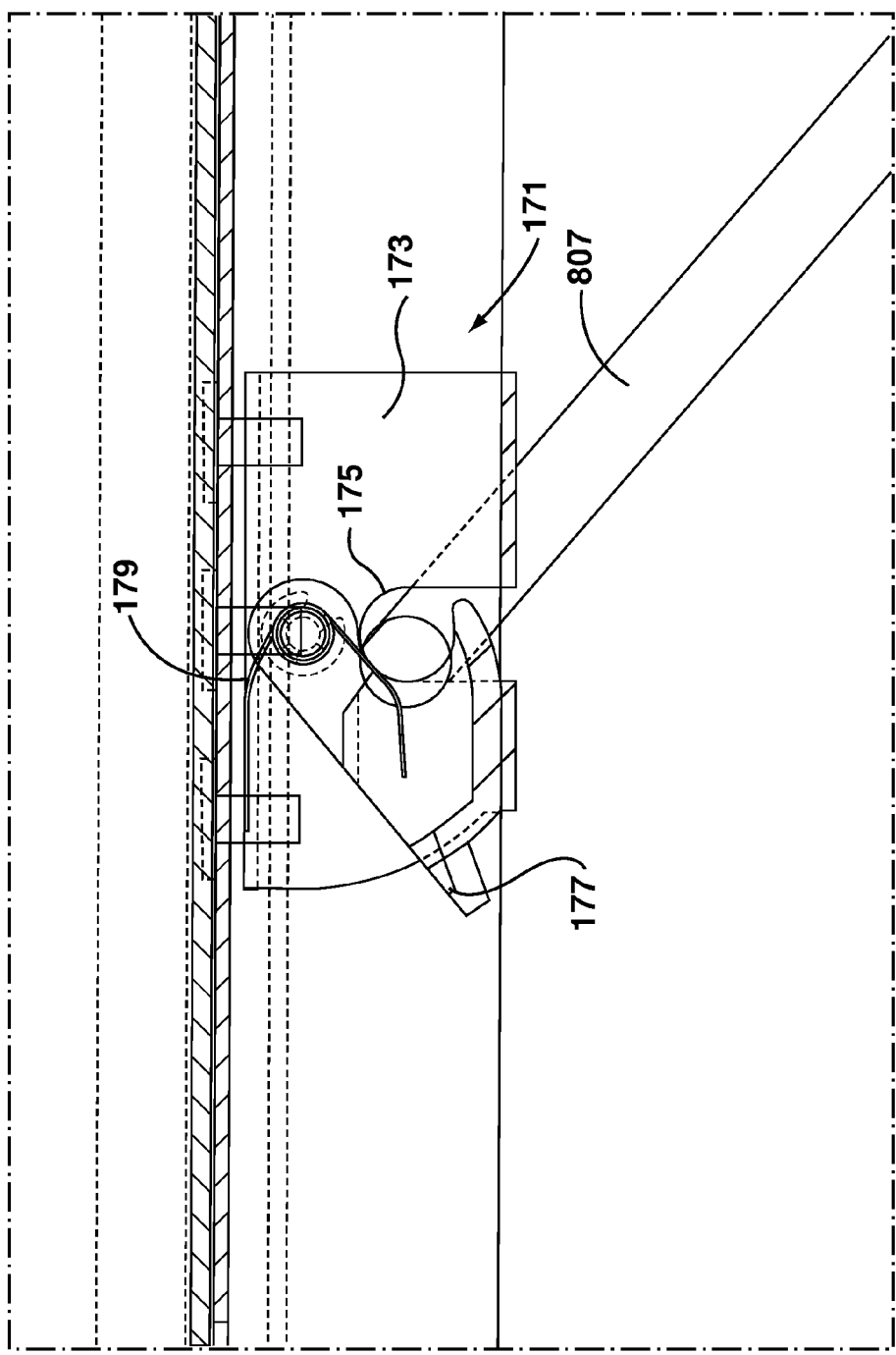
FIG. 13 is a magnified view of a retainer used in the folding wagon.

Retainer 171 is preferably of quick-release type. As shown in FIG. 13, an embodiment of retainer 171 comprises a housing 173, preferably of stainless steel with a slot 175 for receiving the cylindrical second end of the stay 807. Spring 179 biases notched tab 177 into retaining position for selectively retaining the stay 807. In use, retainer 171 retains the stay 807. When a user (not shown) pushes notched tab 177 toward the lower surface of the front section 103, the second end of the stay 807 is released and can slide along slot 175 away from the lower surface of the front section 103 until retainer 171 no longer receives the stay 807. The user may then fold the stay 807 away from the leg 805 about the axis of rotation defined by the intersection of the stay 807 with the leg 805 such that the leg 805 is substantially coplanar with the stay 807 as shown in FIG. 12; when the user rotates the second end of the stay 807 toward the lower surface of the front section 103, the suspension assembly is substantially flat, as shown in FIG. 12.

Preferably, the suspensions 141 and 151 are fabricated using a lightweight minimally thin sheet metal and tubular structure. As shown FIG. 8, leg 805 is fabricated from shaped sheet metal, preferably of stainless steel to resist corrosion. Stay 807 is preferably fabricated from a bent metal rod, also of stainless steel to prevent corrosion. The metal rod should be sized so that stay 807 is configured for releasable engagement with the retainer 171 described above.

In still further embodiments, the front and rear suspensions 141 and 151 do not fold. It will be appreciated that front and rear suspensions 141 and 151 may consist of any type of attachment for mounting the wheels 131 to the bases 111 of the sections 103 and 105. For instance, a suspension may comprise a welded joint between the base 111 and an axle for mounting the wheels 131. Alternatively, it will be appreciated that a suspension may comprise at least a C-bolt for attaching an axle for mounting wheels 131 to the lower surface of the front section 103 or the rear section 105.

In preferred embodiments as shown in FIG. 8, the front suspension 141 provides for steering of the wagon. Transverse support 803 is attached to the leg 805 as previously described in detail. Transverse support 803 is configured to receive therethrough three pins 855, one at each of the centre, first end and second end of the transverse support 803. Each pin 855 disposed near the ends of the transverse support 803 pivotally engages an axle plate 857, each axle plate 857 supporting an axle 601 and also being disposed to receive vertically therethrough a pin 855 for pivotal engagement with a first end of a tie rod 859. The pin 855 at the centre of the transverse support 803 pivotally engages tiller arm 851. Tiller arm 851 has a first end disposed with a pivot 853 which permits a handle 181, described in greater detail below, to pivot, providing for variations in terrain and user height and posture; tiller arm 851 has a second end for pivotally receiving further pins 855, each of which engages a second end of one of the tie rods 859; tiller arm 851 is pivotally coupled between its first and second ends to transverse support 803. In use, a user steers the folding wagon 101 by pulling handle 181 in any direction. Handle 181 correspondingly pivots tiller arm 851. As tiller arm 851 pivots about pin 855 disposed between the pivot 853 and the second end, tiller arm 851 moves the tie rods 859 so that axle plates 857 substantially replicate the rotation of tiller arm 851 and rotate axles 601. It will be appreciated that a user can thereby steer the folding wagon 101. It will be further appreciated that the configuration shown in FIG. 8 provides for accurate and stable steering; however, other steering configurations are known in the art and would provide steering. For instance, fifth-wheel type steering, which is common on wagons, may be used.

In embodiments, the folding wagon does not require a handle: a user simply pushes the folding wagon, or attaches a strap or rope to the folding wagon to pull it. Preferably, however, the folding wagon includes a handle 181. More preferably, the handle 181 attaches to the steering configuration previously described. In embodiments, the handle is folding, or telescopic as shown in FIG. 8. Handle 181 is telescopic between a collapsed position and an extended position. Handle 181 has a grip 189 for a user to hold, a first tubular extension 187 attached to grip 189 and disposed inside second tubular extension 185; second tubular extension 185 terminates at clip 183 which is adapted for pivotal coupling with pivot 853 in tiller arm 851. A releasable pin 184 ties handle 181 to the front suspension 141. Sprung pins 188 are disposed near the end of the first tubular extension 187 distal from grip 189 and engage corresponding holes in second tubular extension 185. In use, when the handle 181 is in the collapsed position, first tubular extension 187 is telescopically received within the second tubular extension 185. A user can extend the handle 181 by withdrawing the first tubular extension 187 from the second tubular extension 185 until sprung pins 188 engage corresponding holes in the second tubular extension 185. A user can telescopically collapse the handle 181 once the user has radially inwardly pushed the sprung pins 188 so that they disengage from the corresponding holes in the second tubular extension 185. It will be appreciated that the configuration described can significantly reduce the length of the handle 181 so that it fits into the folding wagon 101 when the folding wagon 101 is in the folded position as shown in FIG. 12.

In embodiments, a folding wagon 101 is provided which is sufficiently robust to carry goods on rough terrain while being configured to fold into a configuration that is compact enough to fit into the trunk of a standard sedan. In use, a user can fold the folding wagon 101 from the extended position best shown in FIG. 1 into the folded position as shown in FIG. 12. Beginning with the extended position shown in FIG. 3, wheels 131 are coupled to the front and rear suspensions 141 and 151. The handle 181 is attached to the front suspension 141, and the front and rear suspensions are extended, as shown in FIG. 8. Retainers 171 are in the retaining position, as shown in FIG. 10 so that the front section 103 is retained in coplanar arrangement with the rear section 105. In order to fold the folding wagon 101, a user engages the sleeve 613 described above and shown in FIG. 6B and removes all wheels 131, as shown in FIG. 8. Next, the user releases the handle 181 by removing the releasable pin 184 coupling the handle 181 to the pivot 853 on the front suspension 141.

FIG. 8 shows the folding wagon 101 with the wheels 131 and the handle 181 removed. Optionally, the user collapses handle 181 at this stage. The user then collapses the front and rear suspensions 141 and 151 in the manner described above, and releases latches 161 so that the claw 165 no longer retains inner transverse tube 209. The front and rear sections 41 and 151 are now ready to be folded.

Figure 11:
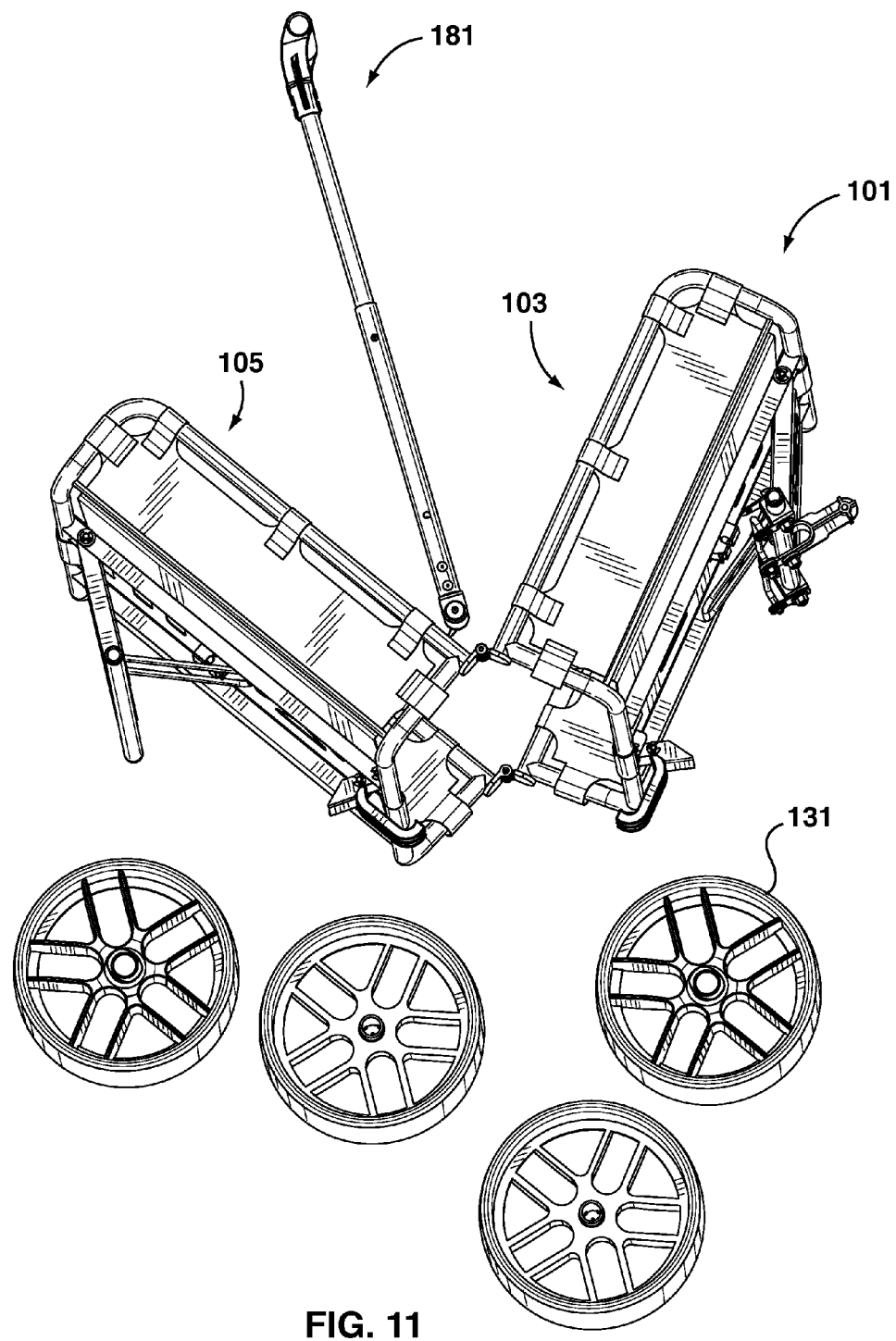
FIG. 11 is a bottom perspective view of the folding wagon in a folding position.

As shown in FIG. 11, in transition, the user (not shown) rotates the front section 103 and the rear section 105 towards each other so that the upper surface of the front section 103 opposes the upper surface of the rear section 105. The user continues this folding action until the upper surface of the front section 103 is substantially parallel with the upper surface of the rear section 105, as shown in FIG. 12. The user can then insert wheels 131 and handle 181 into the space defined between the opposing front and rear sections 103 and 105. It will be appreciated that the user can extend the folding wagon 101 into the extended position shown in FIG. 1 by reversing the processes described herein.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A folding wagon, comprising:
    a front section and a rear section, each section comprising:
        a base having an upper surface and a lower surface;
        a suspension mounted to the lower surface, the suspension releasably supporting at least one wheel; and
        sidewalls extending from the upper surface for holding items;
    at least one hinge offset from the upper surface of the front section and the rear section by at least the greater of the axial width of each wheel and the height of the sidewalls, the at least one hinge pivotally coupling the front section to the rear section between an extended position in which the front section is substantially coplanar with the rear section, and a folded position in which the upper surface of the front section is opposed to and substantially parallel with the upper surface of the rear section and in which the wheels are placeable between the upper surface of the front section and the upper surface of the rear section to be at least partially encompassed by the sidewalls and the bases of the front section and the sidewalls and the bases of the rear section; and
    at least one latch coupled to the base of one of the front section and the rear section for releasably retaining the base of the other of the front section and the rear section in the extended position.

2. The folding wagon of claim 1, wherein the at least one latch comprises a lever pivotally coupled to the lower surface of the one of the front section and the rear section, a claw pivotally coupled at a first end to the lever and at a second end being configured for releasably retaining the other one of the front section and the rear section.

3. The folding wagon of claim 1, wherein the suspension of at least one of the front section and the rear section is a folding suspension.

4. The folding wagon of claim 3, wherein each folding suspension comprises:
    a leg having first and second ends, the first end being pivotally coupled to the base;
    a transverse support coupled to the second end for mounting the at least one wheel; and
    a stay having a first end and a second end, the first end being pivotally coupled to the leg and the second end being releasably engageable by a retainer mounted to the base, wherein the stay holds the leg extended below the base when the stay is engaged by the retainer, and wherein the stay and the leg are configured to fold substantially alongside the lower surface of the base when the stay is released from the retainer.

5. The folding wagon of claim 1, wherein the folding wagon further comprises a handle for releasable attachment to the front suspension.

6. The folding wagon of claim 5, wherein the handle is telescopic between an extended state and a collapsed state.

7. The folding wagon of claim 2, wherein each of the sidewalls and the base of the front section and the rear section comprise a tubular frame.

8. The folding wagon of claim 7, wherein each of the sidewalls and the base is further defined by at least a flexible surface attached to the tubular frame structure and defining the base and sidewalls.

9. The folding wagon of claim 8, wherein the flexible surface is made of a semi rigid polymer material.

10. The folding wagon of claim 9, wherein the semi rigid polymer material is a high-density polyethylene.

11. The folding wagon of claim 1, wherein the suspension mounted to the front section provides for steering of the wagon.

* * * * *